(12) United States Patent
Isaacson

(10) Patent No.: US 7,913,902 B2
(45) Date of Patent: Mar. 29, 2011

(54) SYSTEM AND METHOD FOR IMPLEMENTING A VIRTUAL AUTOMATED TELLER MACHINE

(75) Inventor: Scott Isaacson, Kamuela, HI (US)

(73) Assignee: Novell, Inc., Provo, UT (US)

( * ) Notice: Subject to any disclaimer, the term of this patent is extended or adjusted under 35 U.S.C. 154(b) by 522 days.

(21) Appl. No.: 12/103,408

(22) Filed: Apr. 15, 2008

(65) Prior Publication Data

US 2009/0259592 A1    Oct. 15, 2009

(51) Int. Cl.
*G06K 5/00* (2006.01)
(52) U.S. Cl. .............. 235/380; 705/72; 705/14; 705/37; 705/39; 713/172
(58) Field of Classification Search .................. 235/380, 235/375, 379; 705/72, 14, 37, 39; 713/172
See application file for complete search history.

(56) References Cited

U.S. PATENT DOCUMENTS

| | | | |
|---|---|---|---|
| 2004/0215964 A1* | 10/2004 | Barlow et al. .................. | 713/172 |
| 2006/0213980 A1* | 9/2006 | Geller et al. .................. | 235/380 |
| 2008/0103972 A1* | 5/2008 | Lane .............................. | 705/44 |
| 2008/0133396 A1* | 6/2008 | De La Motte .................. | 705/37 |

* cited by examiner

*Primary Examiner* — Allyson N Trail
(74) *Attorney, Agent, or Firm* — Haynes and Boone, LLP

(57) ABSTRACT

Method and system for implementing a virtual automated teller machine ("VATM") system are described. In one embodiment, the system includes a VATM host connectable to each of a plurality of registered disbursement entities ("DEs") via a secure connection, such as an SSL connection. The system further includes an accessing computer connectable to the VATM host via a secure connection, such as an SSL connection, the accessing computer comprising a card reader for reading user information from an ATM card and having installed thereon VATM client software executable by the accessing computer to interact with the VATM host to validate user information read from the ATM card and an associated PIN entered by a user and, responsive to the validation, present the user with a list of DEs comprising at least one of the registered DEs, prompt the user to select one DE from the list of DEs from which funds are to be disbursed to the user, and specify an amount of funds to be disbursed. The VATM host sends a disbursement order to the selected DE indicating the specified amount of funds to be disbursed.

20 Claims, 2 Drawing Sheets

SYSTEM AND METHOD FOR IMPLEMENTING A VIRTUAL AUTOMATED TELLER MACHINE

BACKGROUND

Automated teller machines ("ATMs") are generally widely available, but they may remain somewhat inaccessible to travelers who are staying in an unfamiliar city or who arrive late to a city and do not want to venture out to locate an ATM at an inconvenient time. Additionally, travelers may be so busy during their stay in a city that they literally cannot find the time to get to an ATM. Moreover, in foreign cities, in which ATMs are hosted by banks with which a traveler may not be familiar, the traveler may have some concern about whether the ATM and/or bank can be trusted with their sensitive information, such as their PIN.

SUMMARY

One embodiment is a system for implementing a virtual automated teller machine ("VATM"). The system includes a VATM host connectable to each of a plurality of registered disbursement entities ("DEs") via an SSL connection or another similar encrypted connection protocol that is in standard use by financial institutions to connect to PATMs. The system further includes an accessing computer connectable to the VATM host via an SSL (or similar) connection, the accessing computer comprising a card reader for reading user information from an ATM card and having installed thereon VATM client software executable by the accessing computer to interact with the VATM host to validate user information read from the ATM card and an associated PIN entered by a user and, responsive to the validation, present the user with a list of DEs comprising at least one of the registered DEs, prompt the user to select one DE from the list of DEs from which funds are to be disbursed to the user, and specify an amount of funds to be disbursed. The VATM host sends a disbursement order to the selected DE indicating the specified amount of funds to be disbursed.

DETAILED DESCRIPTION

This disclosure relates generally to ATMs and, more specifically, to system and method for implementing a virtual ATM via a personal computer, such as a laptop computer.

Figure 1:
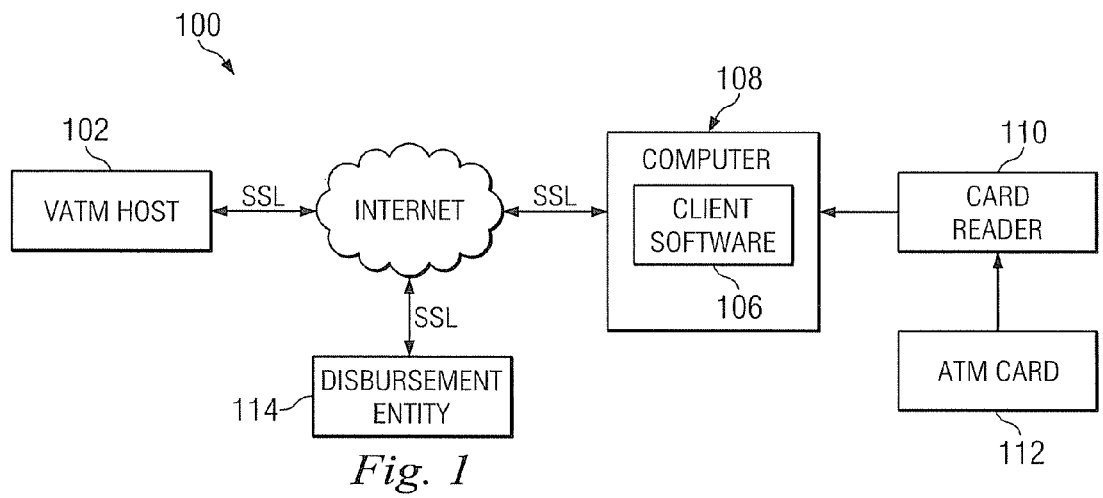
FIG. 1 is a block diagram of a VATM system in accordance with one embodiment.

FIG. 1 is a block diagram of a virtual ATM ("VATM") system 100 in accordance with one embodiment. The VATM 100 includes a VATM host 102 that provides the services described herein. In one embodiment, the VATM host 102 is a bank or other financial institution that preferably also operates physical ATMs ("PATMs"). The VATM host 102 distributes a public key with VATM client software 106, which when installed and executed a user's computer 108, such as a laptop computer, implements a VATM interface for enabling interaction between the user and the VATM host 102, as will be described in detail below.

A card reader 110 is associated with the computer 108 to read information (such as customer name, account information, and bank routing information) from an ATM card 112. The card reader 110 may be integrated into or connectable (e.g., via a USB port) to the computer 108. In one embodiment, the card reader 110 is a magnetic card stripe reader and the requisite information is read from a magnetic stripe on the ATM card as the card is swiped through the reader 110. It will be recognized, however, that other configurations of card readers/cards may be implemented without departing from the spirit of the scope of the embodiments described herein.

In one embodiment, the VATM client software 106 installed on the computer 108 is designed to provide the same user interface experience as a PATM. The client software 106 may be included in the trusted computing base ("TCB") with the integrated card reader for the most secure implementation of the embodiments described herein. In operation, as will be described below, the client software 106 collects the user information from the ATM card via the card reader 110 and the user's PIN and performs the same PIN block encryption and PIN verification value ("PVV") protections that are currently performed in connection with PATMs.

The VATM system 100 further includes a plurality of disbursement entities ("DEs"), represented in FIG. 1 by a DE 114, which may include, for example, hotels and other travel service providers listed by name and location, that have previously registered and have accounts with the VATM host. Unlike PATMs, in the VATM system 100, the user will be presented with a list of DEs from which the user can select a DE from which the cash will be disbursed. It will be noted that filters for narrowing the list of DEs presented to the user (e.g., by type or location) may be employed in various embodiments. In one embodiment, a GPS system included in the computer 108 will narrow the list of DEs displayed to those within a default radius of the location of the computer. The GPS-determined location can be overridden by the user; additionally, the user can change the default radius to increase or decrease the area of interest. The user is prompted to select one of these listed DEs for disbursing the cash.

Once the transaction is verified, as described in greater detail below with reference to FIG. 3, a disbursement order is sent to the selected DE. Among other information that may be included in the disbursement order is the amount of the disbursement. At some future point in time, the user will arrive at the DE, provide the required identification information, and, upon verification thereof, collect the requested cash amount. As will be described, the DE subsequently interfaces with the VATM host 102 to complete the transaction and prompt the VATM host to transfer funds from the user's account to that of the DE.

Figure 2:
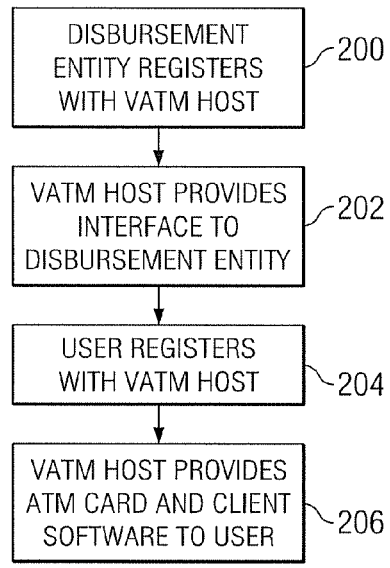
FIG. 2 is a flowchart illustrating a registration phase implemented in connection with a VATM system in accordance with one embodiment.
Figure 3:
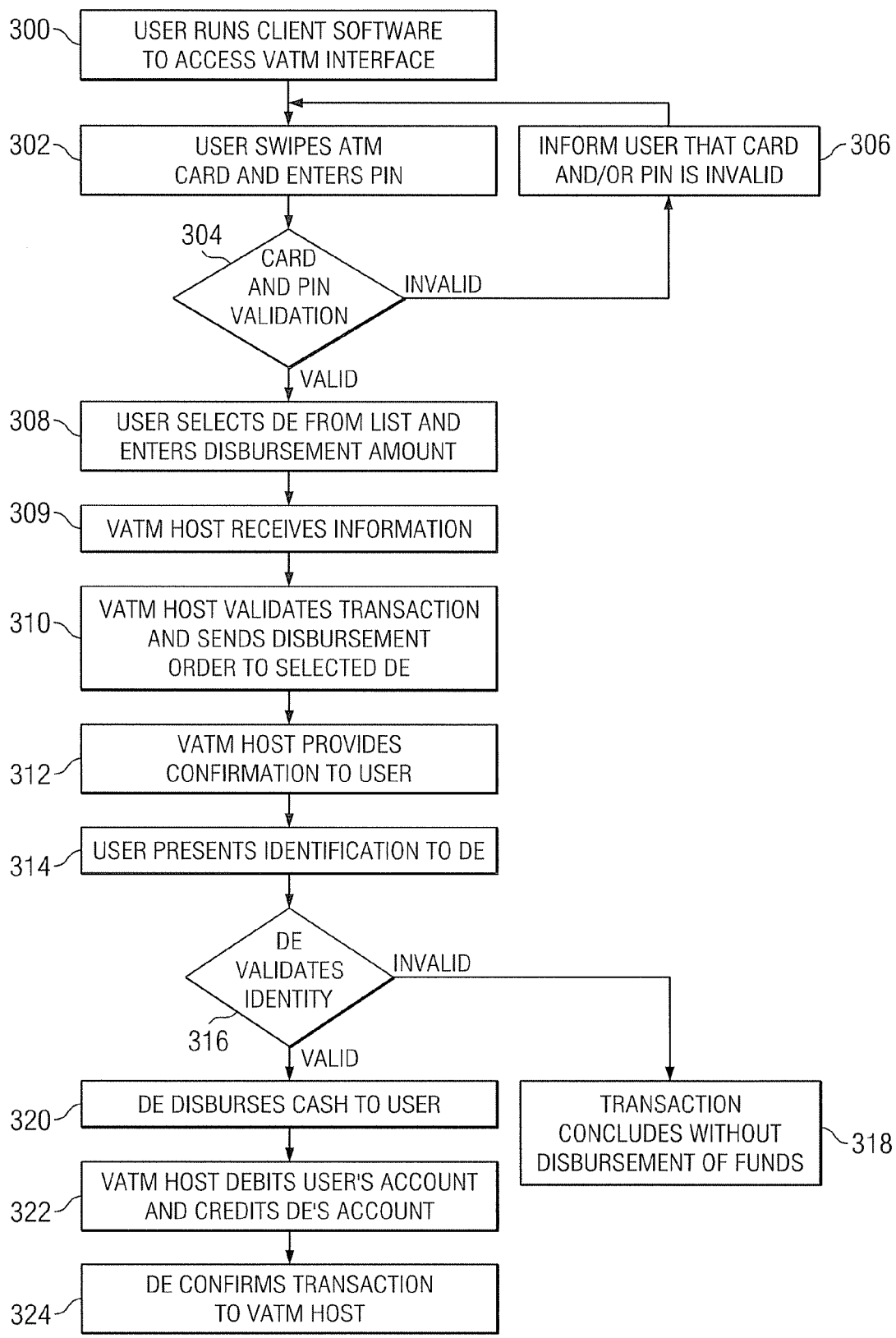
FIG. 3 is a flowchart illustrating a transaction phase implemented in connection with a VATM system in accordance with one embodiment.

Referring now to FIGS. 2 and 3, operation of a VATM system such as that illustrated in FIG. 1 will be described in greater detail. In particular, FIG. 2 is a flowchart illustrating a registration phase in accordance with one embodiment. In step 200, a DE, such as the DE 114, registers and establishes an account with a VATM host, such as the VATM host 102. The registration process may be physical, e.g., via a signed contract, or online, e.g., via a web portal. During the registration process, various information related to VATM transactions may be specified, such as the types of identification that are acceptable to the DE (e.g., U.S. or other passport, state driver's license, and employee badge, and the maximum disbursement amount allowed (if that amount differs from that of the VATM host).

In step 202, the VATM host provides the DE with a DE provider interface, which may be, for example, a fat client or a web portal. The DE provider interface allows for notifications to be transmitted between the VATM host and the DE. It also enables the DE to communicate with the VATM host to confirm transactions and manage the flow of cash to or from the VATM host. The DE interface with the VATM host is protected with a mutually authenticated SSL connection.

In step 204, a user registers with the VATM host. This process is essentially the same as the process used to register with the VATM host with respect to PATMs. For example, the user establishes and funds an account with the VATM host and otherwise manages the account. Additionally, the user provides identification information, such as U.S. or other passport number, state driver's license number, and/or employee badge information.

In step 206, the VATM host provides the user with an ATM card, such as the ATM card 112, which in one embodiment is the same card that is used to access PATMs, in addition to the client software (such as the software 106) to install on the computer the user will use to access the VATM (e.g., the computer 108). Alternatively, if the user already has an ATM card issued by the VATM, the existing ATM card will be updated to enable access to the VATM system as described herein. As discussed above, the accessing computer must have a card reader appropriate for reading the ATM card provided by the VATM host either connectable thereto or integrated therewith. In one embodiment, the VATM host will provide the user with a card reader along with an ATM card. The interface between the user's computer and the VATM host computer is protected with a mutually authenticated SSL connection.

It will be recognized that steps 204-206 may be executed prior to or substantially contemporaneously with steps 200-202. Additionally, steps 200-202 will be implemented for each DE that registers with the VATM host; therefore, the steps may be implemented numerous times in connection with the VATM system. Similarly, steps 204-206 will be implemented for each user that registers with the VATM host; therefore, the steps may be implemented numerous times in connection with the VATM system.

FIG. 3 is a flowchart illustrating a transaction phase in accordance with one embodiment. In step 300, the user accesses the VATM interface on his/her computer. In step 302, in response to prompts presented on the computer via the VATM interface, the user uses the card reader associated with the computer to read the ATM card and enters his or her PIN. In step 304, the client software communicates with the VATM host computer to validate the ATM card information and PIN using established PVV techniques. If the ATM card information and PIN are not valid, execution proceeds to step 306, in which the user is advised of that fact, and then returns to step 302. If the ATM card information and PIN are valid, execution proceeds to step 308.

In step 308, a list of registered DEs is presented to the user and the user is prompted to select one. Also in this step, the user enters a disbursement amount. In step 309, the information entered by the user in step 308 is sent to the VATM host. In step 310, the VATM host validates the transaction and sends a disbursement order to the selected DE. In one embodiment, the disbursement order includes the requested disbursement amount. In an optional step (not shown), the VATM host may send an error back to the user if any error conditions, such as that the DE is unavailable or has no cash, are detected.

In step 312, the VATM host computer confirms the transaction to the VATM client software, which in turn provides a confirmation message to the user via the user interface. The confirmation message will advise the user as to when the cash will be available. In a preferred embodiment, it will be recognized that, in order to replicate the behavior of PATMs, the cash should be immediately available at the DE. The confirmation message may be as specific as "go to the front desk of the Marriott Hotel at 1555 N Main Street and ask for Joan Young" and may also include a transaction ID.

In step 314, upon arrival at the DE location, the user presents the required identification, as well as a transaction ID, if necessary. In step 316, an agent of the DE reviews the identification presented by the user and, if it determined not to be valid, in step 318, the transaction is denied and concludes without disbursement of the funds. If the identification presented by the user is determined to be valid, in step 320, the DE disburses cash to the user. In step 322, the DE confirms the transaction with the VATM host. In step 324, the VATM host debits the user's account and credits the DE's account in the amount of the disbursement. Additionally, the appropriate accounts may be debited or credited in the amount of fees associated with the transaction.

During a reconciliation phase (not shown), which will occur periodically throughout the term of the contract between the VATM host and the DE and independently of any user disbursement transactions, funds and statements will flow between the DE and the VATM host as necessary to close out all user transactions that occurred within the period. It will be recognized that the funds can flow either as cash or as electronic funds transfers as specified in the contract between the DE and the VATM host.

It is understood that modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

Although the present disclosure has described embodiments relating to specific networking environments, it is understood that the apparatus, systems and methods described herein could applied to other environments. While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A virtual automated teller machine ("VATM") system comprising:
 a VATM host connectable to each of a plurality of registered disbursement entities ("DEs") via a secure connection (or similar encrypted connection protocol); and
 an accessing computer connectable to the VATM host via an SSL connection, the accessing computer comprising a card reader for reading user information from an ATM card and having installed thereon VATM client software executable by the accessing computer to interact with the VATM host to validate user information read from the ATM card and an associated PIN entered by a user and, responsive to the validation, present the user with a list of DEs comprising at least one of the registered DEs, prompt the user to select one DE from the list of DEs from which funds are to be disbursed to the user, and specify an amount of funds to be disbursed;

wherein the VATM host sends a disbursement order to the selected DE indicating the specified amount of funds to be disbursed.

2. The VATM system of claim 1 wherein the accessing computer further comprises a GPS system for identifying a location of the accessing computer and wherein the list of DEs comprises ones of the registered DEs located within a predetermined distance from the identified location of the accessing computer.

3. The VATM system of claim 1 wherein an interface between at least one of the registered DEs and the VATM host is a fat client.

4. The VATM system of claim 1 wherein an interface between at least one of the registered DEs and the VATM host is a web portal.

5. The VATM system of claim 1 wherein the VATM client software is provided to the user by the VATM host upon registration of the user.

6. The VATM system of claim 1 wherein the VATM host provides a confirmation message to the user.

7. The VATM system of claim 1 wherein the selected DE validates an identity of the user prior to disbursing the specified amount of funds to the user.

8. The VATM system of claim 7 wherein the selected DE validates an identity of the user by requiring the user to present a preselected form of identifying information.

9. A method of implementing a virtual automated teller machine ("VATM") system, the method comprising:
reading information of a user from an ATM card;
verifying the read ATM card information and a PIN entered by the user;
providing the user with a list of disbursement entities ("DEs");
prompting the user to select one of the DEs and indicate an amount of funds to be disbursed;
transmitting a disbursement order from a VATM host to the selected one of the DEs directing the selected one of the DEs to disburse the indicated amount of funds to the user upon presentation of preapproved identification information.

10. The method of claim 9 wherein the preapproved identification information is selected from a group of identification information consisting of drivers license information, passport information, and employee badge information.

11. The method of claim 9 wherein the reading is performed by a card reader associated with an accessing computer having installed thereon VATM client software.

12. The method of claim 11 wherein the verifying is performed by the accessing computer interacting with the VATM host via a secure connection.

13. The method of claim 9 further comprising, prior to the reading, the DEs registering with the VATM host.

14. The method of claim 13 further comprising, responsive to the registering, providing each of the DEs with an interface selected from a group consisting of a fat client and a web portal.

15. The method of claim 9 further comprising, prior to the reading, the user registering with the VATM host and, responsive to the registering, providing the user with VATM client software for installation on the computer.

16. A computer program product for implementing a virtual automated teller machine ("VATM") system, the computer program product comprising:
a computer-readable medium having stored thereon instructions executable by a computer for causing the computer to:
interact with a card reader to read information of a user from an ATM card;
interact with a VATM host to verify the read ATM card information and a PIN entered by the user;
interact with the VATM host to display to the user a list of disbursement entities ("DEs") available for disbursing funds to the user;
prompt the user to select one of the DEs and indicate an amount of funds to be disbursed; and
transmit an indication of the selected one of the DEs and the indicated amount of funds to be disbursed to the VATM host;
wherein the VATM host transmits a disbursement order to the selected one of the DEs directing the selected one of the DEs to disburse the indicated amount of funds to the user upon presentation of preapproved identification information.

17. The computer program product of claim 16 wherein the preapproved identification information is selected from a group of identification information consisting of drivers license information, passport information, and employee badge information.

18. The computer program product of claim 17 wherein a connection between the computer and the VATM host is an SSL connection.

19. The computer program product of claim 17 wherein the connection between the VATM host and each of the DEs is an SSL connection.

20. The computer program product of claim 17 wherein an interface between the VATM host and each of the DEs is an interface selected from a group consisting of a fat client and a web portal.

* * * * *